Figure 1:
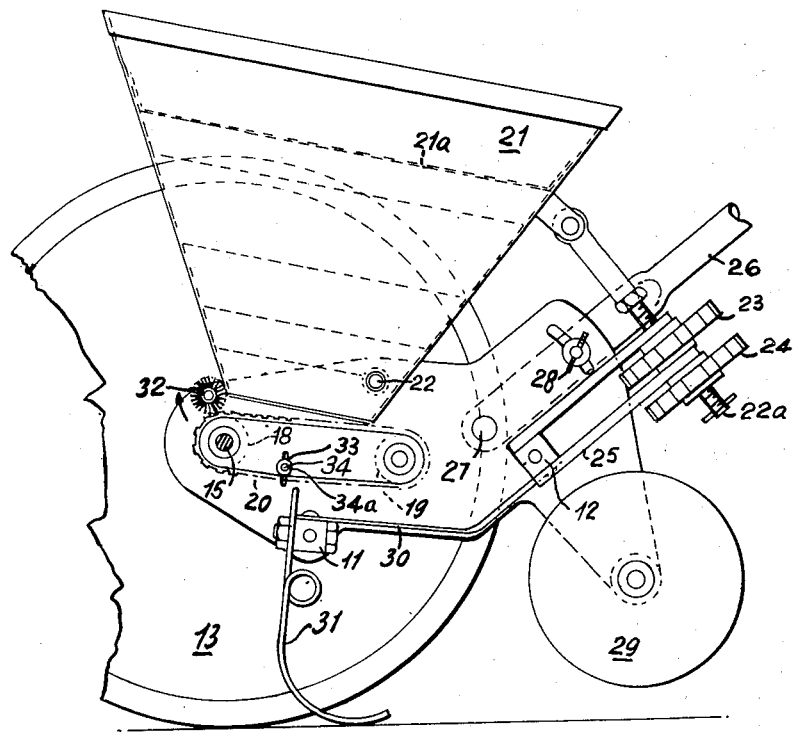

Jan. 5, 1965 D. B. HARGREAVES ETAL 3,164,301
WHEELED DISTRIBUTOR WITH IMPERFORATE CONVEYOR BAND
Filed Sept. 14, 1961 4 Sheets-Sheet 1

INVENTORS:
DEREK BURTT HARGREAVES
ERIC STANIFORTH
BY
Frederick Bratenfeld
ATTORNEY Jan. 5, 1965    D. B. HARGREAVES ETAL    3,164,301
WHEELED DISTRIBUTOR WITH IMPERFORATE CONVEYOR BAND
Filed Sept. 14, 1961    4 Sheets-Sheet 4

INVENTORS:
DEREK BURTT HARGREAVES
ERIC STANIFORTH
BY
*Frederick Breitenfeld*
ATTORNEY United States Patent Office 3,164,301
Patented Jan. 5, 1965

3,164,301
WHEELED DISTRIBUTOR WITH IMPERFORATE CONVEYOR BAND
Derek B. Hargreaves, "Wych Cottage," Wych Lane, Adlington, Macclesfield, Cheshire, England, and Eric Staniforth, Gatley, Cheshire, England (9 Ward Ave., Bollington, Macclesfield, Cheshire, England)
Filed Sept. 14, 1961, Ser. No. 138,197
12 Claims. (Cl. 222—163)

This invention relates to an improved distributor for example for the distribution of a chemical fertilizer in powdered, granular or like form and either as a relatively small distributor for manual operation and suitable for use on lawns or greens, or in a larger size for use on grass land or for agricultural purposes.

One of the problems in the distribution of modern fertilizers, or other dressings, is their high concentration and the resultant necessity for accuracy of application as regards uniformity and quantity of dispersion, especially in the lower quantity range, with a need for simple and accurate adjustability to suit requirements according to variation of conditions or selection of material. The main purpose for such concentration of fertilizers or other dressings, is, of course, the saving of weight and bulk for ease of transport and storage. The only alternative to distributing such materials in their concentrated form is to dilute them with sand or other "bulking" material, but the efficiency of such alternative is dependent in the first place upon the efficient mixing of the concentrate with the "bulking" material, which mixing may not always be easy, as for instance when the concentrated material and/or the bulking material is at all damp.

Accuracy of distribution is essential especially with such materials as any localised excess can cause damage, or is wasted, whilst a deficiency reduces the efficiency of the treatment.

One object of the present invention is to provide a distributor which will provide a high degree of accuracy of distribution, especially for the smaller quantity range per given area.

Another object of the invention is to provide a simple means for obtaining variation of the rate of delivery by the distributor with maintained accuracy, and of calibrating the same.

Another object of the invention is to provide self-cleaning of the delivery and measuring means.

Another object of the invention is to ensure removal of the metered material from the conveyor.

Another object of the invention is to improve dispersion of the material during distribution.

Another object of the invention is to enable the delivery means to be easily removed for cleaning, adjusting or replacement.

Another object of the invention is to enable the distributor to be more easily guided over the ground so as to minimise the incidence of any gap or overlap between adjacent passes of the distributor.

According to the invention the distributor comprises a wheeled chassis, a conveyor system comprising a conveyor band and supporting rollers therefor, mounted on the chassis means for driving the conveyor at a speed which is a function of the speed of the supporting wheels of the chassis, means such as a hopper for delivering material to the conveyor band for distribution and depth gauge and means for determining the depth of material on the band before delivery thereby, the conveyor band having transverse surface grooves of such filled volume and spacing as to define a minimum rate of delivery per unit length of travel of the band.

The expression "a wheeled chassis" or "ground wheel" is used herein to include an endless track or caterpillar where appropriate, as for instance a pair of caterpillar tracks, one on each side of the machine could replace the pair of wheels used in the example described below when constructing a large or wide distributor.

Figure 2:
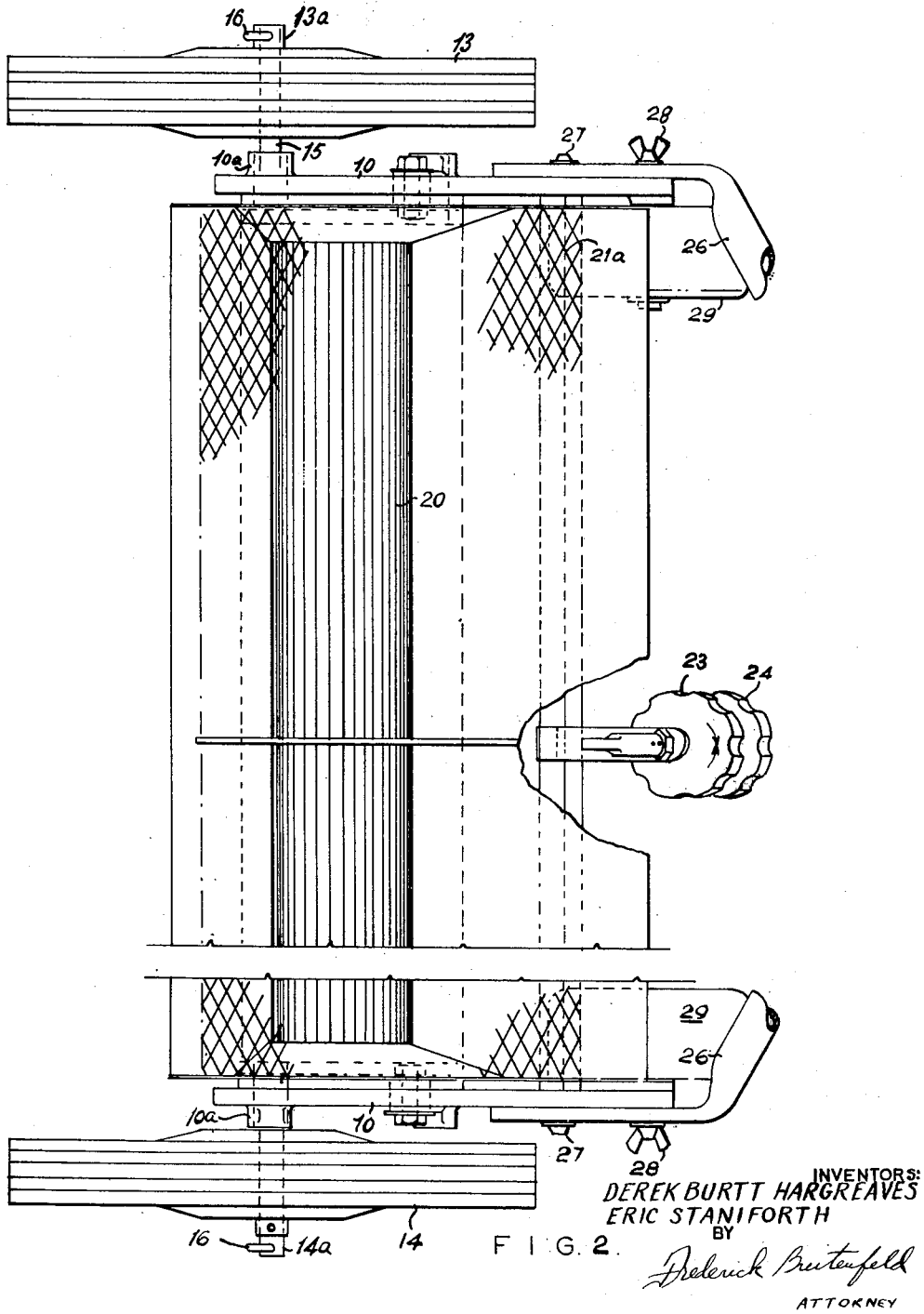
Figure 3:
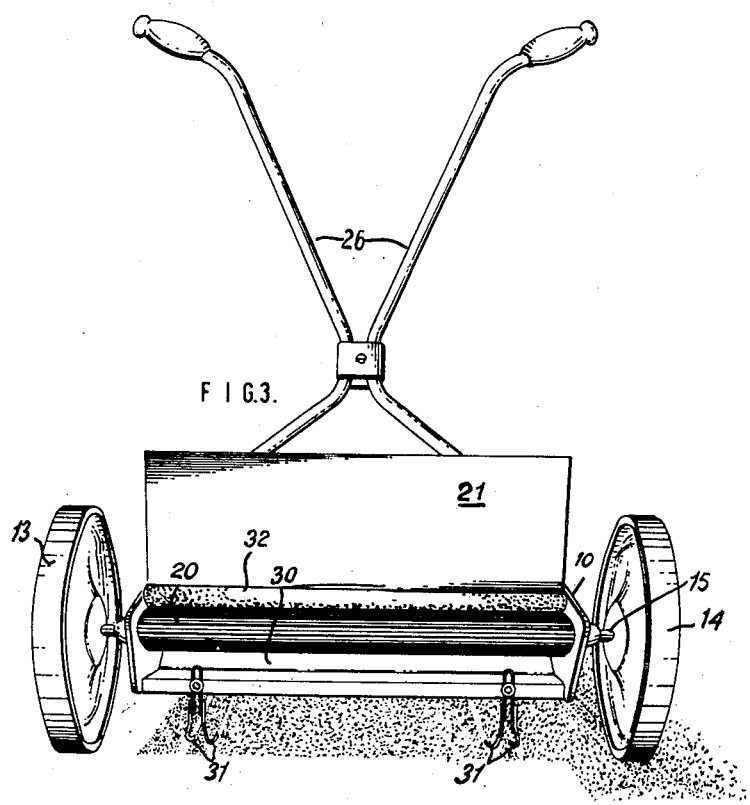
Figure 4:
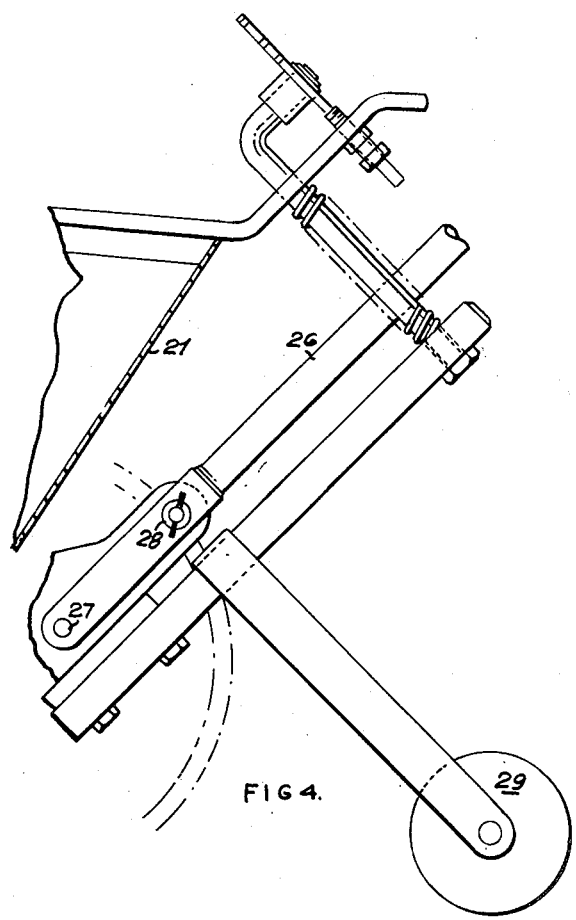
Figure 5:
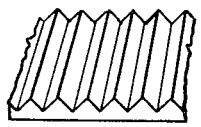
Figure 6:
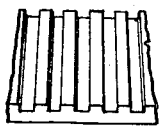

In the accompanying drawing:
FIG. 1 is a side elevation of one example of a distributor made in accordance with the present invention.
FIG. 2 is a plan of part of FIG. 1.
FIG. 3 is a front view of the machine shown in FIGS. 1 and 2.
FIG. 4 is a fragmentary side elevation of a modification of FIG. 1.
FIGS. 5 and 6 are fragmentary views of alternative forms of conveyor band for use in the distributor shown in FIGS. 1 to 3.

As shown in FIGS. 1 to 3 the distributor is a hand manipulated model suitable for use on lawns, grass tennis courts, bowling greens, golf greens etc. It comprises of a wheel chassis consisting of side frames 10 secured together by front and rear stays 11 and 12. The chassis carries a pair of ground wheels 13, 14 mounted on an axle 15 which is journalled in bearings 10a in the side frames, the wheels being located on the ends of the axle on the outside of the frames. The wheels each have a hub extension 13a, 14a respectively formed with a through hole complementary to a hole in the end of the shaft so that, as shown in FIG. 2, the wheel 13 may be keyed to the shaft by an axle pin 16, or as shown for the wheel 14 the axle pin merely acts as a retainer to keep the wheel on the shaft whilst leaving it free to rotate thereon. For wheeling the distributor to the site, for example between the greens of a golf course, both wheels may be set to "free wheel" on the shaft as for the wheel 14, whilst in use, one or both wheels may be keyed by the pin to the shaft. On the axle 15 is a roller 18 whilst between the side frames and to the rear of the roller 18 is a second roller 19 and these rollers support a conveyor band 20 having a transversely grooved upper surface the grooves of which may be of rectangular cross section as shown in FIG. 4 or of V shape as shown in FIG. 5. These grooves are of such dimension that when filled the band will deliver the minimal desired quantity of material per unit area as a function of the periphery of the ground wheels and of the relative travel of the band driven thereby. The band is preferably of a rubber construction so as to be fitted under tension, but the rear roller may be mounted if desired, in any suitable known manner, to enable the band to be tensioned, or slackened off when not in use.

Material to be distributed is supplied to the conveyor band by a hopper 21 which is pivotally mounted at 22 to the side frames so that the rear lower edge of the hopper is just clear of the band. The front lower edge is adapted to operate as a gauge by tilting the hopper and can be adjusted or set to the desired tilt by means of a screw 22a and nuts 23, 24 carried in a bifurcated bracket 25 extending between and secured by its ends to the side frames. Within the hopper is a wire screen 21a placed well above the working volume of the hopper. A manipulating handle 26 is adjustably connected to the side frames by pivots 27 and wing nuts 28. At the rear of the side frames is an extension carrying a supplementary ground roller or wheels 29.

Beneath the conveyor is a tray or shield 30 whilst attached to the cross bar 11 are a pair of wire markers 31 shaped as shown. At the front of the distributor is a brush 32 adapted to be rotated in any suitable manner from the axle 15 in the direction shown by the arrow. Between the frames and located by slots 33 therein is a further roller 34 which rests on the under run of the band and as a flat 34a on its periphery.

In use, for minimal delivery the nuts 23, 24 may be set so that the leading edge of the front wall of the hopper is substantially touching the top of the conveyor band so that the filled volume of the grooves is an accurate measure of the rate of delivery. Thereby, great accuracy is obtainable at the minimum rate of delivery. As the tilt of the hopper is adjusted a carpet of the material passes under the front edge of the hopper and such carpet is frictionally keyed to the material in the grooves so that longitudinal slip is substantially eliminated. The material as it moves downwardly on the band portion contacting the front roller is engaged by the brush and distributed evenly. At the same time, any risk that material may remain in the grooves is reduced by the opening action as the band is bent to the curvature of the front roller whilst the roller 34 produces a light vibrating action on the under-run of the band to shake off any adhering material in the grooves.

The marker wires 31 touch the ground lightly and make marks thereon, or in the dust of the material as it is laid, and these lines are so positioned that on the next pass of the distributor it is easy for the operator to guide the machine so that a wheel runs between the lines, thus giving correct laying of the next swath without gap or overlap.

We claim:

1. A distributor comprising a wheeled chassis having side frames, an imperforate conveyor band and supporting rollers therefor mounted on the side frames, means for driving the conveyor band at a speed which is a function of the speed of movement of the wheeled chassis, and a hopper over the conveyor band for supplying to the conveyor band the material to be distributed, the hopper being tiltably mounted on said side frames, and means for defining the depth of material on the conveyor band as it passes from below the hopper, said means comprising a non-yielding depth-defining edge on the forward or leading edge of the hopper, and manually adjustable means for tilting the hopper to various angular positions in order to vary the clearance of said edge from the conveyor band, said adjustable means being mounted on the side frames and connected to the hopper, the said imperforate band being formed with material-holding grooves defining a minimal rate of delivery at zero clearance of the depth-defining edge.

2. A distributor according to claim 1 further characterised in that the adjustable securing means for the hopper comprises an arm attached to the hopper complementary to toothed rack carried by a steering handle attached to the chassis.

3. A distributor according to claim 1 further characterised in that the adjustable securing means for the hopper comprises screw and nut means located between the hopper and said side frames.

4. A distributor according to claim 1 further characterised by a steering handle attached to the chassis, a rear roller mounted at the rear of the chassis normally clear of the ground but providing ground-engaging means alternative to the ground wheels for enabling maneuvering of the chassis without movement of the conveyor band.

5. A distributor according to claim 1 characterised by means coupling one of the band rollers to at least one wheel of the chassis and means for uncoupling the same.

6. A distributor according to claim 1 further characterised by brush means arranged to disperse the material delivered by the conveyor band.

7. A distributor according to claim 1 characterised by means for vibrating the under-run of the conveyor band.

8. A distributor according to claim 1 characterised in that the means for delivering material to the conveyor band comprises a hopper having level indication lines on its inner surface corresponding to volume unit content.

9. A distributor according to claim 1 characterised by marker means on the chassis arranged to mark a line to be followed by a wheel of the chassis on an adjacent run.

10. A distributor according to claim 1 characterized in that the hopper is pivotally mounted near its rear edge for tilting movement to carry the said clearance.

11. A distributor according to claim 10 characterized in that the conveyor band is formed with transverse surface grooves of such volume and spacing as to define a minimal rate of delivery per unit length of travel of the band.

12. A distributor according to claim 10 further characterized by filter means in the hopper adapted to receive the material when filling the hopper.

References Cited by the Examiner
UNITED STATES PATENTS

| | | | |
|---|---|---|---|
| 83,449 | 10/68 | Berney | 222—154 |
| 146,288 | 1/74 | Smallwood | 222—415 X |
| 266,157 | 10/82 | Hurt et al. | 222—163 X |
| 333,351 | 12/85 | Smith et al. | 222—163 X |
| 1,632,659 | 6/27 | Mauch | 222—415 X |
| 2,589,425 | 3/52 | Newman et al. | 222—282 X |
| 2,624,492 | 1/53 | Seltzer | 222—177 |
| 2,771,223 | 11/56 | Ryan | 222—233 X |
| 2,784,880 | 3/57 | Pio | 222—414 X |
| 2,840,275 | 6/58 | Liljenberg. | |
| 2,913,150 | 11/59 | Seale | 222—415 X |

FOREIGN PATENTS 816,274 4/37 France.

LOUIS J. DEMBO, *Primary Examiner.*

RAPHAEL M. LUPO, *Examiner.*